United States Patent
Andou et al.

(10) Patent No.: US 7,216,858 B2
(45) Date of Patent: May 15, 2007

(54) FLUID-FILLED VIBRATION DAMPING DEVICE

(75) Inventors: Tetsuji Andou, Inuyama (JP); Masahiko Nagasawa, Kani (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 32 days.

(21) Appl. No.: 11/057,536

(22) Filed: Feb. 14, 2005

(65) Prior Publication Data

US 2005/0189686 A1   Sep. 1, 2005

(30) Foreign Application Priority Data

Feb. 27, 2004 (JP) .............................. 2004-055468
Feb. 7, 2005 (JP) .............................. 2005-030697

(51) Int. Cl.
*F16F 5/00* (2006.01)
(52) U.S. Cl. ................................. 267/140.13
(58) Field of Classification Search ............ 267/140.13
See application file for complete search history.

(56) References Cited

U.S. PATENT DOCUMENTS

| 4,568,069 | A | * | 2/1986 | Poupard ................. 267/140.13 |
| 4,657,232 | A | * | 4/1987 | West ...................... 267/140.13 |
| 4,697,793 | A | | 10/1987 | Reuter et al. |
| 4,726,573 | A | | 2/1988 | Hamaekers et al. |
| 4,781,362 | A | | 11/1988 | Reuter et al. |
| 5,205,545 | A | * | 4/1993 | Quast .................... 267/140.13 |
| 5,853,063 | A | | 12/1998 | Meyerink et al. |
| 6,250,616 | B1 | * | 6/2001 | Suzuki et al. .......... 267/140.13 |
| 6,257,562 | B1 | * | 7/2001 | Takashima et al. ...... 267/141.1 |
| 6,443,438 | B2 | * | 7/2001 | Satori et al. ........... 267/140.13 |
| 6,311,963 | B1 | * | 11/2001 | Suzuki et al. .......... 267/140.13 |
| 6,669,182 | B2 | * | 12/2003 | Hibi et al. ............. 267/140.13 |
| 6,685,175 | B2 | * | 2/2004 | Takashima et al. ..... 267/140.13 |
| 6,799,753 | B2 | | 10/2004 | Okanaka et al. |
| 6,820,867 | B2 | * | 11/2004 | Satori et al. ........... 267/140.13 |
| 7,025,340 | B2 | * | 4/2006 | Inoue .................... 267/140.13 |
| 2001/0011790 | A1 | * | 8/2001 | Satori et al. ........... 267/140.13 |
| 2003/0205856 | A1 | * | 11/2003 | Hibi et al. ............. 267/140.13 |
| 2004/0119215 | A1 | | 6/2004 | Nanno et al. |

FOREIGN PATENT DOCUMENTS

| JP | 7-107416 B2 | 11/1995 |
| JP | 2805305 B2 | 7/1998 |
| JP | 2001-336564 A1 | 12/2001 |
| JP | 2002-081491 A1 | 3/2002 |
| JP | 2004-003634 A1 | 1/2004 |
| JP | 2004-190757 A1 | 7/2004 |

\* cited by examiner

*Primary Examiner*—Robert A. Siconolfi
(74) *Attorney, Agent, or Firm*—Burr & Brown

(57) ABSTRACT

A vibration damping device, including: first and second mounting members spaced apart from one another; an elastic body interposed between and connecting the two mounting members; a diaphragm cooperating with the elastic body to define therebetween a fluid chamber; and a partition structure including a partition member and a flexible movable plate disposed in a central opening of the partition member so as to divide the fluid chamber into primary and auxiliary fluid chambers communicating through an orifice passage, wherein the movable plate has a primary-fluid-chamber-side recess which is formed in one of opposite surfaces thereof on the side of the primary fluid chamber and an auxiliary-fluid-chamber-side groove in the other surface located on the side of the auxiliary fluid chamber so as to be positioned radially outwardly of the recess and which continuously or discontinuously extends in the circumferential direction.

9 Claims, 12 Drawing Sheets

FLUID-FILLED VIBRATION DAMPING DEVICE

This application is based on Japanese Patent Application Nos. 2004-055468 and 2005-030697 respectively filed on Feb. 27, 2004 and Feb. 7, 2005, the contents of which are incorporated hereinto by reference.

BACKGROUND OF THE INVENTION

1. Field of the Invention

The present invention relates to a fluid-filled vibration damping device suitably employed as engine mounts, body mounts, etc., for use in automotive vehicles, for instance.

2. Discussion of Related Art

In installing, on an automotive vehicle, a power unit such as engine as a vibration generating source, an engine mount as a vibration damping device is generally interposed between two members, i.e., between a body frame of the vehicle and the power unit, for instance. There is known a fluid-filled vibration damping device shown in FIG. 13 as one example of such an engine mount.

The fluid-filled vibration damping device shown in FIG. 13 includes: a shaft-like first mounting member 101; a cylindrical second mounting member 102 located radially outwardly of the first mounting member 101 with a suitable radial distance therebetween, in coaxial relation with each other; an elastic body 103 interposed between the first and second mounting members 101, 102 so as to connect those members 101, 102 integrally to each other; a diaphragm 104 which is retained at its peripheral portion by an inner circumferential portion of the second mounting member 102 and which cooperates with the elastic body 103 to define therebetween a fluid chamber 145 which is filled with a fluid L; and a partition structure 105 which includes an annular metallic partition member 151 and a flexible movable plate 152 disposed in a central opening of the metallic partition member 151 and which is retained at its peripheral portion by the inner circumferential portion of the second mounting member 102 so as to divide the fluid chamber 145 into a primary fluid chamber 146 and an auxiliary fluid chamber 147 that communicate with each other through an orifice passage 157.

The fluid-filled vibration damping device described above is installed on the vehicle such that the first mounting member 101 is fixed to a mounting portion of the power unit and the second mounting member 102 is fixed to a mounting portion of the vehicle body, whereby the power unit is suspended from the vehicle body in a vibration damping or isolating fashion.

When vibrations in a high frequency range are generated by actuation of the engine, for instance, with the fluid-filled vibration damping device installed as described above, the vibrations can be effectively absorbed owing to elastic deformation of the elastic body as a result of relative displacement of the first mounting member 101 and the second mounting member 103. Vibrations in a low frequency range such as engine shakes, on the other hand, can be effectively absorbed owing to resonance of the fluid L which flows between the primary fluid chamber 146 and the auxiliary fluid chamber 147 through the orifice passage 157 as a result of a fluid pressure variation in the primary fluid chamber 146 upon application of the vibrations.

In the fluid-filled vibration damping device described above, when the fluid pressure variation in the primary fluid chamber 146 rapidly increases by application of large vibrations thereto, the orifice passage 157 is placed in a clogged state, so that the fluid L does not flow therethrough. When the orifice passage 157 is placed in the clogged state, the negative pressure generated in the primary fluid chamber 146 immediately after the clogging of the orifice passage 157 also increases, so that a multiplicity of air bubbles are generated in the fluid L of the primary fluid chamber 146, causing a cavitation phenomenon (hereinafter may be referred to simply as "cavitation"). The air bubbles thus generated in the fluid L of the primary fluid chamber 146 undesirably cause abnormal noise upon disappearance or extinction by the subsequent pressure variation or impact, and the abnormal noise is undesirably transmitted to the vehicle cabin, causing a risk of deterioration in silence in the vehicle cabin and driving comfort as felt by a vehicle driver or passengers. The abnormal noise which results from the cavitation tend to be generated when large vibrations are input upon starting of the engine, during running on bumpy roads, etc.

In view of the above, there are proposed various fluid-filled vibration damping devices which are arranged to deal with the cavitation.

For instance, JP-A-2004-003634 proposes a fluid-filled vibration damping device adapted for absorbing or mitigating an impact wave generated upon disappearance of the bubbles by a coating rubber layer which is provided on a surface of an orifice-defining member at a primary-fluid-chamber-defining area. In the disclosed device, however, when the coating rubber layer is formed integrally with the orifice-defining member by injecting a rubber material for the coating rubber layer into a mold and vulcanizing the rubber material, the pressure required for the injection of the rubber material is high, thereby causing a risk of deformation of the orifice-defining member. Thus, the proposed device has a problem in its production.

JP-A-2004-190757 discloses a fluid-filled vibration damping device adapted for preventing growth of the air bubbles by providing a cushion surface which is opposed to an opening of an orifice passage to a primary fluid chamber with a suitable spacing distance therebetween. This arrangement, however, requires an additional member for providing the cushion surface, undesirably pushing up the cost of manufacture of the device.

JP-B-7-107416 and Japanese Patent No. 2805305 propose a technique to prevent occurrnce of the cavitation by providing a slit (a cut portion) at the middle of a partition member which partially defines a primary fluid chamber and an auxiliary chamber so as to provide a movable plate (elastic plate, or elastic partition wall) functioning as a valve, thereby preventing the fluid pressure in the primary fluid chamber from considerably lowered to negative pressure so as to avoid the occurrence of the cavitation.

In the disclosed technique, the movable plate having the slit (the cut portion) formed by cutting the movable plate in its thickness direction needs to assure sealing tightness at the slit to a certain degree of the fluid pressure. Since the adjustment between the fluid pressure and the sealing tightness is subtle, however, the disclosed technique may suffer from a difficulty in producing the movable plate.

In addition, in the movable plate functioning as the valve, the slit which has been placed in its open state by the fluid pressure needs to return to its closed state. The slit (the cut portion) may fail to close and remain in the open state due to subtle deformation of the slit or creep of the rubber that provides the movable plate as an elastic body, causing a problem of insufficient sealing tightness. Thus, even where the difference in the fluid pressure between the primary fluid chamber and the auxiliary fluid chamber is small, the slit (the cut portion) in the movable plate tends to be kept in the open state, making it difficult to assure good resonance effect based on the fluid flowing through an orifice passage.

SUMMARY OF THE INVENTION

The present invention has been made in the light of the situations described above. It is therefore an object of the invention to provide a fluid-filled vibration damping device which prevents generation of abnormal noise due to cavitation upon application of large vibrations thereto while assuring good vibration damping capability in normal state.

The above-indicated object of the present invention may be achieved according to a principle of the invention, which provides a fluid-filled vibration damping device for connecting two members in a vibration-damping fashion, comprising: a first mounting member which is to be fixed to one of the two members; a cylindrical second mounting member which is disposed so as to be spaced apart from the first mounting member and which is to be fixed to the other of the two members; an elastic body which is interposed between the first mounting member and the second mounting member for connecting the first mounting member and the second mounting member integrally to each other; a diaphragm whose peripheral portion is retained by the second mounting member so that the diaphragm cooperates with the elastic body to define therebetween a fluid chamber which is filled with a fluid; and a partition structure which includes an annular metallic partition member and a flexible movable plate disposed in a central opening of the annular metallic partition member and whose peripheral portion is retained by the second mounting member so as to divide the fluid chamber into a primary fluid chamber and an auxiliary fluid chamber which communicate with each other through an orifice passage, wherein the movable plate has a primary-fluid-chamber-side recess which is formed in one of opposite surfaces thereof located on the side of the primary fluid chamber and which has a predetermined depth; and an auxiliary-fluid-chamber-side groove which is formed in the other of the opposite surfaces located on the side of the auxiliary fluid chamber so as to be positioned radially outwardly of the primary-fluid-chamber-side recess and which continuously or discontinuously extends in the circumferential direction.

In the present fluid-filled vibration damping device constructed as described above, the movable plate has the primary-fluid-chamber-side recess formed in one of its opposite surfaces located on the side of the primary fluid chamber and the auxiliary-fluid-chamber-side groove formed in the other of the opposite surfaces located on the side of the auxiliary fluid chamber so as to be positioned radially outwardly of the primary-fluid-chamber-side recess, so that there is formed, between the primary-fluid-chamber-side recess and the auxiliary-fluid-chamber-side groove, an inclined portion which is inclined such that its diameter gradually increases in a direction from the auxiliary fluid chamber toward the primary fluid chamber. According to this arrangement, when the movable plate deforms or displaces toward the primary fluid chamber upon generation of negative pressure in the primary fluid chamber, the inclined portion is subjected to compressive deformation or shearing deformation depending upon the magnitude of the force applied thereto, whereby the rigidity of the movable plate is relatively low (i.e., the movable plate is relatively hard) in an initial period of its deformation, and the rigidity of the movable plate increases (i.e., the movable plate becomes soft) with an increase in the amount of its deformation.

Described in detail, when the movable plate is oscillated or vibrated in a relatively small amplitude range, the inclined portion of the movable plate is subjected to compressive force acting thereon from opposite ends of the inclined portion as seen in the direction of inclination, whereby the auxiliary-fluid-chamber-side groove is deformed such that the groove is collapsed with its space being narrowed. Consequently, the movable plate has increased rigidity at the inclined portion and a portion thereof subjected to the compressive force, so that the deformation of the movable plate is restricted, thereby assuring an increase in the negative pressure in the primary fluid chamber. Accordingly, the present arrangement assures, with high reliability, resonance effect of the fluid flowing through the orifice passage from the auxiliary fluid chamber to the primary fluid chamber, resulting in good vibration damping capability.

When the movable plate is oscillated or vibrated in a large amplitude range beyond the above-indicated small amplitude range, the inclined portion is subjected to shearing force and tensile force, so that the auxiliary-fluid-chamber-side groove is deformed such that the groove is widened, thereby decreasing the rigidity of the movable plate at the inclined portion and a portion thereof subjected to the tensile force. Accordingly, the movable plate is easily deformed so as to prevent the negative pressure in the primary fluid chamber from being rapidly increased, thereby placing the primary fluid chamber in a condition in which the cavitation described above is not likely to occur. Therefore, it is possible to prevent generation of the abnormal noise which arises from the cavitation.

The movable plate in the present fluid-filled vibration damping device has flexibility and is formed of ordinary rubber such as natural rubber, synthetic rubber, or a blend thereof, or soft resin, for instance. In general, the movable plate preferably has a thick-walled peripheral portion fixed to the metallic partition member and a thin-walled main body portion located radially inwardly of the peripheral portion and having a thickness smaller than that of the peripheral portion. Where the thus constructed movable plate is employed, the movable plate can be firmly fixed to and retained by the metallic partition member at the thick-walled peripheral portion thereof. The main body portion substantially functions as the movable plate. It is possible to suitably determine the degree of flexibility required by the main body portion by making the thickness of the main body portion smaller than that of the peripheral portion. For instance, the surface configuration of the main body portion may be freely selected from among a flat shape, a curved shape, an inclined shape such as a tapered shape, etc., for instance. It is noted that the thickness of the main body portion need not be necessarily constant, but may be differed at its central portion and its periphery.

The primary-fluid-chamber-side recess formed in the above-indicated one of the opposite surfaces of the movable plate located on the side of the primary fluid chamber (hereinafter this surface may be referred to as "the primary-fluid-chamber-side surface) is generally formed so as to be positioned radially inwardly of the periphery of the main body portion. For instance, the recess may be constituted by a concave groove extending in the circumferential direction of the main body portion, or a concave recess whose contour or profile is a circle or a polygon close to a circle. The primary-fluid-chamber-side recess in the form of the concave groove or recess may extend continuously or discontinuously in the circumferential direction. It is, however, preferable that the primary-fluid-chamber-side recess extends continuously in the circumferential direction to permit uniform deformation of the movable plate. The cross sectional shape, the depth, the size, etc., of the concave groove or recess are suitably determined by taking into account the size of the movable plate (the main body portion), the flexibility required by the movable plate, and the like.

The auxiliary-fluid-chamber-side groove formed in the other of the opposite surfaces of the movable plate located on the side of the auxiliary fluid chamber (hereinafter this surface may be referred to as "the auxiliary-fluid-chamber-side groove") is positioned radially outwardly of the primary-fluid-chamber-side recess. Accordingly, the auxiliary-fluid-chamber-side groove is generally formed at the periphery of the main body portion. The state in which the auxiliary-fluid-chamber-side groove is positioned radially outwardly of the primary-fluid-chamber-side recess means that the bottom portion (the deepest portion) of the auxiliary-fluid-chamber-side groove is located radially outwardly of the bottom portion (the deepest portion) of the primary-fluid-chamber-side recess. The auxiliary-fluid-chamber-side groove may be constituted by a concave groove extending continuously or discontinuously in the circumferential direction of the main body portion of the movable plate. While the auxiliary-fluid-chamber-side groove may be configured to have an annular shape or a polygonal shape close to a circle, it is preferable that the groove has an annular shape to permit uniform deformation of the movable plate. The auxiliary-fluid-chamber-side groove may have any cross sectional shape such as a V-shape or a U-shape. Further, the depth and the width of the auxiliary-fluid-chamber-side groove may be suitably determined by taking into account the size of the movable plate (the main body portion), the flexibility required by the movable plate, and the like.

Between the primary-fluid-chamber-side recess and the auxiliary-fluid-chamber-side groove of the movable plate, the inclined portion is formed which is inclined such that its diameter gradually increases in the direction from the auxiliary fluid chamber toward the primary fluid chamber. While the cross sectional shape and the angle of inclination of the inclined portion varies depending upon the configurations of the primary-fluid-chamber-side recess and the auxiliary-fluid-chamber-side groove, they are suitably determined by considering the rigidity as spring characteristics required by the movable plate.

In forming the auxiliary-fluid-chamber-side groove, it is preferable that the deepest portion (the bottom portion) of the auxiliary-fluid-chamber-side groove is located radially outwardly of the outer peripheral portion of the primary-fluid-chamber-side recess. According to this arrangement, the outer peripheral portion of the primary-fluid-chamber-side recess can be expanded or projected by a sufficiently large amount or the thickness between the deepest portion (the bottom portion) of the auxiliary-fluid-chamber-side grove and the outer peripheral portion of the primary-fluid-chamber-side recess can be made large. Consequently, the inclined portion is subjected to relatively large compressive force when the movable plate is deformed toward the primary fluid chamber, so as to permit the movable plate to exhibit a higher degree of rigidity, thereby advantageously assuring excellent vibration damping or isolating performance. In addition, the movable plate is capable of exhibiting a high degree of durability.

In one preferred form of the present fluid-dilled vibration damping device, the movable plate includes an inner protruding portion having a suitable thickness and located at a radially central portion thereof so as to protrude toward the auxiliary fluid chamber and an outer protruding portion having a suitable thickness and located radially outwardly of the inner protruding portion so as to protrude toward the auxiliary fluid chamber, and portions of the above-indicated one of the opposite surfaces of the movable plate located on the side of the primary fluid chamber, which portions correspond to the inner protruding portion and the outer protruding portion, define the primary-fluid-chamber-side recess whose deepest portion is located at a center of the inner protruding portion while the auxiliary-fluid-chamber-side groove is formed at a radially outer portion of the outer protruding portion. According to this arrangement wherein the inner and outer protruding portions are connected or formed adjacent to each other, the movable plate protrudes toward the auxiliary fluid chamber in two steps. Therefore, the present arrangement permits the movable plate to have increased rigidity upon application of small vibrations and to be deformed to a large extent upon application of large vibrations, advantageously assuring the effect of the invention.

Preferably, the inner protruding portion has a circular shape in a plan view and an arcuate shape in vertical cross section while the outer protruding portion has an annular shape in a plan view and an arcuate shape as a whole in vertical cross section. In this arrangement wherein the inner protruding portion and the outer protruding portion have the respective arcuate shapes in vertical cross section, the primary-fluid-chamber-side recess and the auxiliary-fluid-chamber-side groove can be advantageously formed, enabling the movable plate to be effectively deformed in the manner according to the present invention with high efficiency.

Where the arcuate shape of the inner protruding portion has a radius of curvature smaller than that of the arcuate shape of the outer protruding portion, the movable plate can operate more effectively.

In the present fluid-filled vibration damping device constructed as described above, the movable plate has the primary-fluid-chamber-side recess which is formed in the above-indicated one of the opposite surfaces of the movable plate nearer to the primary fluid chamber and which has a predetermined depth, and the auxiliary-fluid-chamber-side groove which is formed in the other of the opposite surfaces nearer to the auxiliary fluid chamber so as to be positioned radially outwardly of the primary-fluid-chamber-side recess and which extends continuously or discontinuously in the circumferential direction. The present arrangement is effective to prevent occurrence of the abnormal noise due to the cavitation upon application of large vibrations while maintaining good vibration damping or isolating capability in normal state.

Where the deepest portion of the auxiliary-fluid-chamber-side groove is located radially outwardly of the outer peripheral portion of the primary-fluid-chamber-side recess, relatively large compressive force acts on the portion (the inclined portion) of the movable plate interposed or sandwiched by and between the primary-fluid-chamber-side recess and the auxiliary-fluid-chamber-side groove when the movable plate is deformed toward the primary fluid chamber. Therefore, the movable plate is allowed to exhibit a higher degree of rigidity, advantageously assuring good vibration damping or isolating capability. Moreover, the movable plate can exhibit a high degree of durability.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
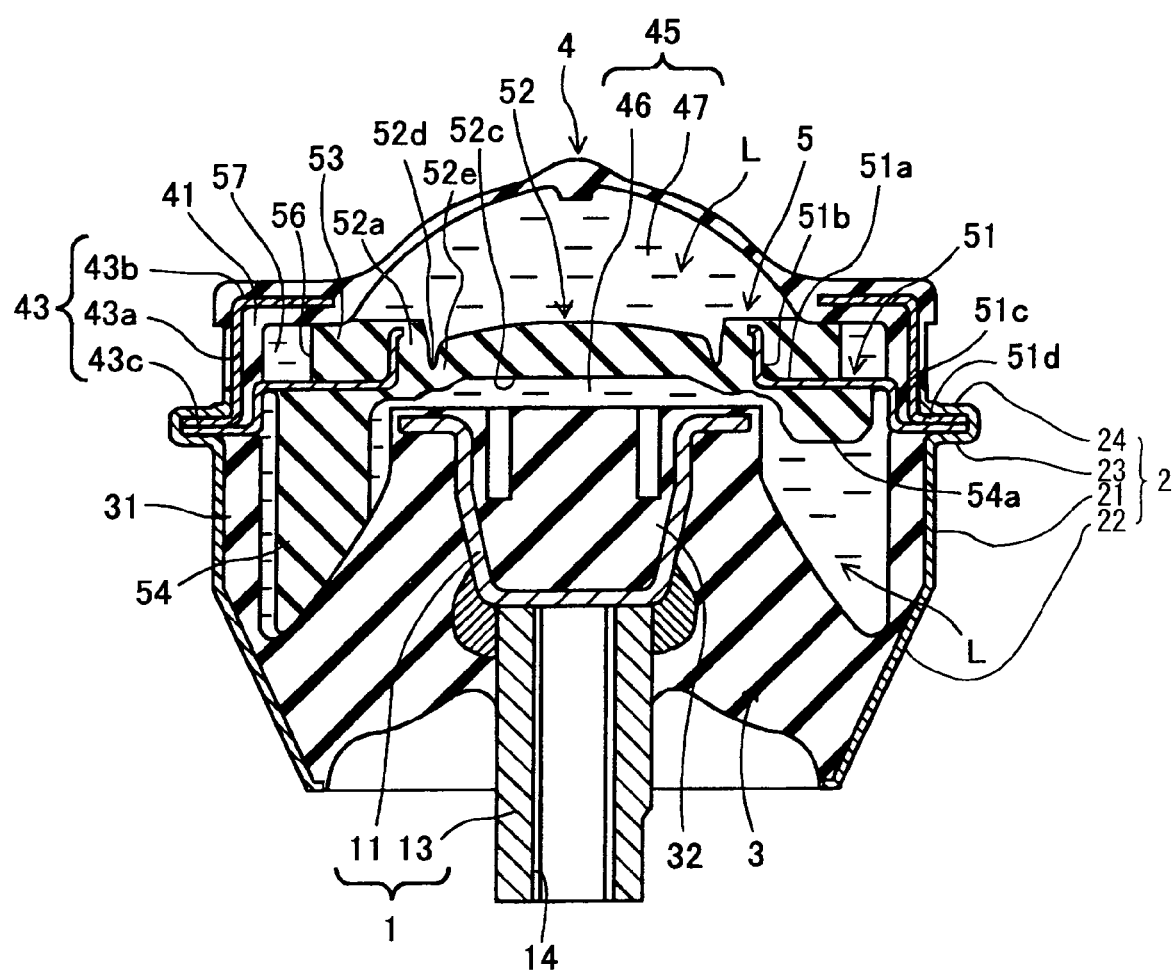
FIG. 1 is a cross sectional view showing a fluid-filled vibration damping device constructed according to a first embodiment of the present invention.

There will be described preferred embodiments according to the present invention by referring to the drawings.

Figure 2:
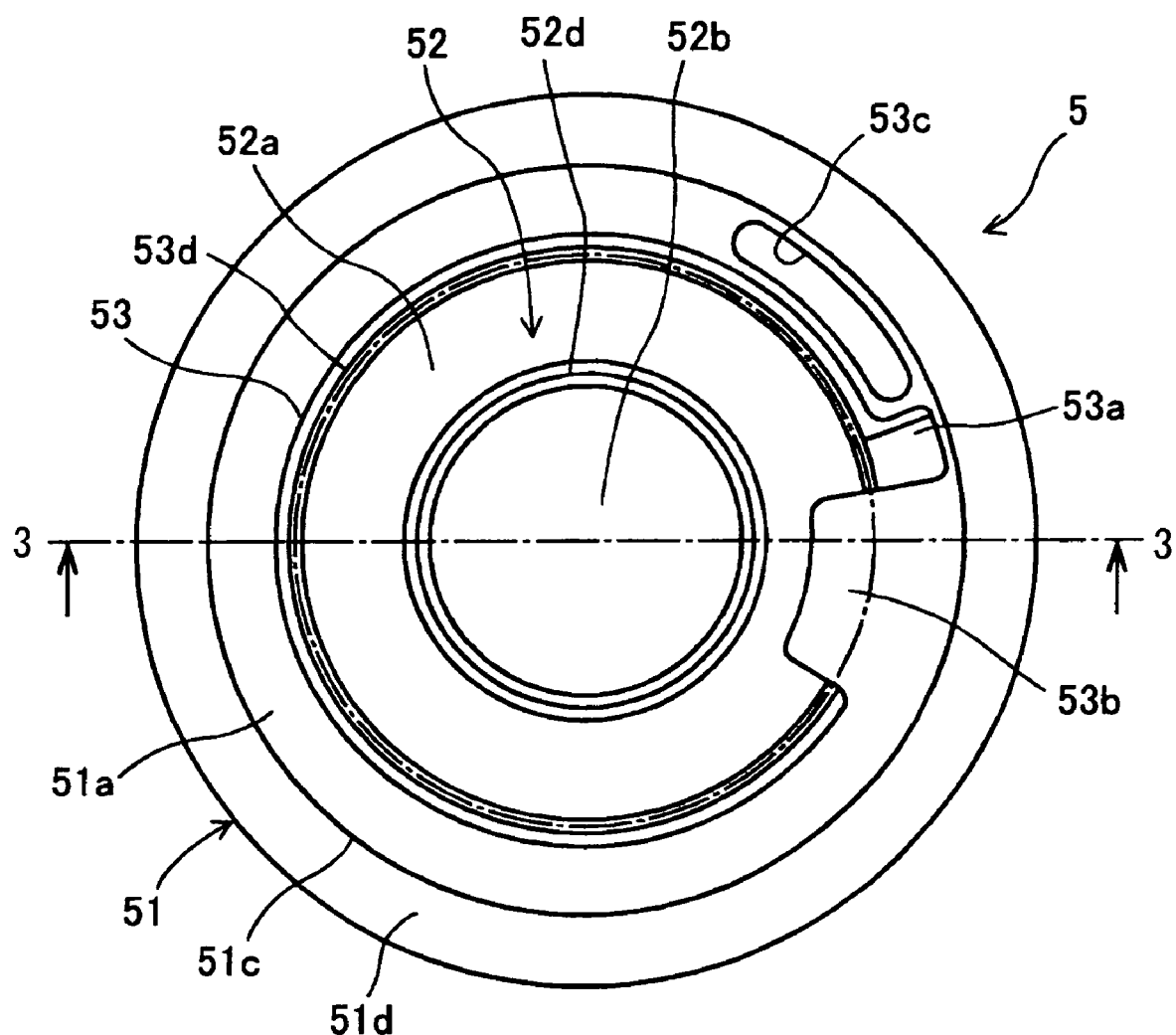
FIG. 2 is a plan view of a partition structure according to the first embodiment.
Figure 3:
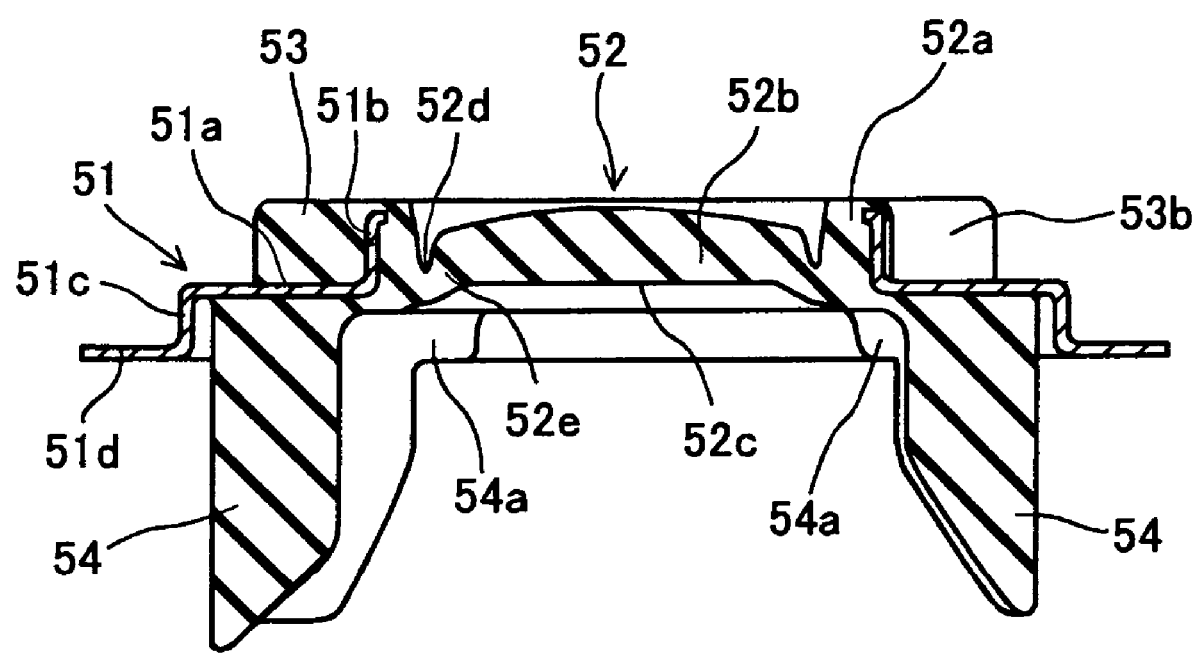
FIG. 3 is a cross sectional view taken along line 3—3 of FIG. 2.

FIG. 1 is a cross sectional view showing a fluid-filled vibration damping device constructed according to a first embodiment of the present invention. FIG. 2 is a plan view of a partition structure in the vibration damping device of FIG. 1. FIG. 3 is a cross sectional view taken along line 3—3 of FIG. 2.

The present fluid-filled vibration damping device shown in FIG. 1 is of a suspension type used as an engine mount for an automotive vehicle. As shown in FIG. 1, the fluid-filled vibration damping device includes: a shaft-like first mounting member 1; a cylindrical second mounting member 2 disposed so as to be spaced apart from the first mounting member with a suitable radial distance therebetween; an elastic body 3 interposed between the first and second mounting embers 1, 2 so as to connect these two members 1, 2 integrally to each other; a diaphragm 4 whose peripheral portion is retained by the inner circumferential portion of the second mounting member 2 so that the diaphragm 4 cooperates with the elastic body 3 to define therebetween a fluid chamber 45; and a partition structure 5 which includes an annular metallic partition member 51 and a movable plate 52 and which divides the fluid chamber 45 into a primary fluid chamber 46 and an auxiliary fluid chamber 47 that communicate with each other through an orifice passage 57. In the following explanation, the vertical direction basically corresponds to the vertical direction as seen in FIG. 1.

The first mounting member 1 includes a metallic cup-shaped member 11 having a generally cylindrical cup shape and a metallic cylindrical member 13 having a generally cylindrical shape and fixed at its one end to the outer bottom surface of the cup-shaped member 11 by welding. The cylindrical member 13 has an outside diameter which is substantially equal to the diameter of the bottom portion of the cup-shaped member 11 and is connected to the cup-shaped member 11 in coaxial relation with each other. The cylindrical member 13 has a threaded central bore which serves as a tapped hole 14. A mounting bolt (not shown) is screwed into the tapped hole 14 of the cylindrical member 13, whereby the first mounting member 1 is fixedly connected to a bracket (not shown) of an engine unit (not shown).

The second mounting member 2 is a thin-walled cylindrical member formed of a ferrous metal and having a diameter larger than the outside diameter of the first mounting member 1. The second mounting member 2 includes: an intermediate cylindrical portion 21; a tapered cylindrical portion 22 which extends from the lower end of the intermediate cylindrical portion 21 in the axially downward direction such that its diameter gradually decreases in that direction; a shoulder portion 23 which extends from the upper end of the intermediate cylindrical portion 21 in the radially outward direction; and a caulking portion 24 which extends from the outer periphery of the shoulder portion 23 in the axially upward direction. The second mounting member 2 is disposed radially outwardly of the first mounting member 1 with a suitable distance therebetween, in coaxial relation with each other. The cup-shaped member 11 of the first mounting member 1 is opposed to the intermediate cylindrical portion 21 of the second mounting member 2 and the axially lower end portion of the cylindrical member 13 of the first mounting member 1 protrudes axially downwardly from the lower open end of the second mounting member 2. The second mounting member 2 is attached to a vehicle body through a bracket (not shown) having a mounting hole into which the intermediate cylindrical portion 21 of the second mounting member 2 is press-fitted.

The elastic body 3 is formed by vulcanization of a rubber material that gives the same 3 integrally with the first and second mounting members 1, 2 so as to be interposed between the two mounting members 1, 2. The elastic body 3 has a generally tapered thick-walled cylindrical shape having a tapered outer circumferential surface whose diameter gradually decreases in the axially upward direction. The elastic body 3 is bonded by vulcanization at an inner circumferential surface of a small-diameter end thereof to the outer circumferential surface of the first mounting member 1 and at an outer circumferential surface of a large-diameter end thereof to the inner circumferential surface of the second mounting member 2. Thus, the first mounting member 1 and the second mounting member 2 are elastically connected to each other by the elastic body 3, and the lower open end of the second mounting member 2 is fluid-tightly closed by the elastic body 3 and the first mounting member 1.

A generally cylindrical rubber coating layer 31 is formed integrally at the outer peripheral portion of the elastic body 3, and is bonded by vulcanization to the substantially entirety of the inner circumferential surface of the second mounting member 2. The elastic body 3 further has a rubber filler 32 formed integrally at an inner peripheral portion thereof so as to fill an inner space of the cup-shaped member 11 of the first mounting member 1.

The diaphragm 4 is an easily-deformable thin-walled rubber film having a dome-like configuration and has a ring-like sealing rubber layer 41 formed integrally at a periphery thereof The diaphragm 4 is formed by vulcanization integrally with a cylindrical metallic retaining member 43 which retains the diaphragm 4 with the sealing rubber layer 41 bonded to the retaining member 43. The retaining member 43 includes: a cylindrical portion 43a; an annular inward flange portion 43b which extends from the upper end of the cylindrical portion 43a in the radially inward direction; and an annular outward flange portion 43c which extends from the lower end of the cylindrical portion 43a in the radially outward direction. The retaining member 43 is formed of a metal by press. The sealing rubber layer 41 is disposed so as to cover the substantially entirety of the cylindrical portion 43a and the inward flange portion 43b of the retaining member 43.

The diaphragm 4 is fixed to the second mounting member 2 with the outward flange portion 43c of the retaining member 43 being held and gripped by an between the shoulder portion 23 and the caulking portion 24 of the second mounting member 2 and fluid-tightly closes the upper open end of the second mounting member 2. Thus, the diaphragm 4 and the elastic body 3 cooperate with each other to define, in the second mounting member 2, a fluid chamber 45 that is filled with a non-compressible fluid "L" such as water, alkylene glycol, silicone oil, or the like.

As shown in FIGS. 1–3, the partition structure 5 includes: an annular metallic partition member 51; a rubber movable plate 52 disposed in a central opening of the partition member 51; a rubber block wall 53 provided on the axially upper surface of the partition member 51; and a pair of restricting projections 54, 54 which are formed of a rubber and which protrude from the axially lower surface of the partition member 51. The movable plate 52, the rubber block wall 53, and the restricting projections 54 are formed by vulcanization integrally with the partition member 51 so as to be bonded to the same 51 during the vulcanization process. Thus, the partition structure 5 is formed as an integral vulcanized assembly.

The partition member 51 includes: an annular base portion 51a; a cylindrical inner wall portion 51b which extends from the inner circumferential end of the base portion 51a in the axially upward direction; a cylindrical outer wall portion 51c which extends from the outer circumferential end of the base portion 51a in the axially downward direction; and an annular flange portion 51d which extends from the lower end of the outer wall portion 51c in the radially outward direction. The partition member 51 is formed of a metal by press.

The movable plate 52 has a disc-like shape and is formed integrally with the partition member 51 by vulcanization of a rubber material that gives the movable plate 52 into an integral vulcanized product. The movable plate 52 is bonded, in the vulcanization process, at its peripheral portion to the inner circumferential surface of the cylindrical inner wall 51b of the partition member 51 so as to cover the entirety of the inner circumferential surface of the cylindrical inner wall 51b. According to this arrangement, the movable plate 52 is disposed so as to close the central opening of the partition member 51 which is located inwardly of the inner wall portion 51b. The movable plate 52 includes: a peripheral portion 52a having a thickness slightly larger than the axial length of the cylindrical inner wall portion 51b of the partition member 51; and a main body portion 52b located radially inwardly of the peripheral portion 52a and having a thickness smaller than that of the peripheral portion 52a.

In one of opposite surfaces of the main body portion 52b of the movable plate 52 which is located on the side of the primary fluid chamber 46 (hereinafter this surface may be referred to as "the primary-fluid-chamber-side surface"), there is formed a circular recess 52c which is located slightly inwardly of the periphery of that surface. (This recess 52c may be hereinafter referred to as "the primary-fluid-chamber-side recess 52c".) The primary-fluid-chamber-side recess 52c is defined by: a circular flat bottom surface which extends from the center of the main body portion 52b with a suitable radius (radial distance); and a side circumferential surface that is provided by an inclined surface which is inclined such that its diameter gradually decreases in a direction from the open end toward the bottom surface of the recess 52c. The open peripheral portion of the primary-fluid-chamber-side recess 52c (the outer peripheral portion of the recess 52c at its open end) is expanded or projected owing to formation of a corner having an obtuse angle. In the meantime, in the other of the opposite surfaces of the main body portion 52b of the movable plate 52 which is located on the side of the auxiliary fluid chamber 47 (hereinafter this surface may be referred to as "the auxiliary-fluid-chamber-side surface"), there is formed an annular groove 52d which is located at a boundary between the peripheral portion 52a and the main body portion 52b. (This annular groove 52d may be hereinafter referred to as "the auxiliary-fluid-chamber-side groove 52d".) The auxiliary-fluid-chamber-side groove 52d has a V-shape in cross section and continuously extends in the circumferential direction of the movable plate 52. The auxiliary-fluid-chamber-side groove 52d is formed radially outwardly of the primary-fluid-chamber-side recess 52c such that its deepest portion, i.e., its bottom, is located radially outwardly of the outer peripheral portion (i.e., the open peripheral portion) of the primary-fluid-chamber-side recess 52c. The inner portion of the above-indicated auxiliary-fluid-chamber-side surface of the main body portion 52b, which inner portion is radially inwardly of the groove 52d, is formed into a curved surface.

Owing to the primary-fluid-chamber-side recess 52c and the auxiliary-fluid-chamber-side groove 52d formed in the main body portion 52b of the movable plate 52 as described above, there is formed an inclined portion 52e in the main body portion 52b which is defined by the side circumferential surface of the primary-fluid-chamber-side recess 52c and the radially inward surface of the auxiliary-fluid-chamber-side groove 52d partially defining the groove 52d and whose diameter gradually increases in a direction from the auxiliary fluid chamber 47 toward the primary fluid chamber 46. Because the angle of inclination of the side circumferential surface of the primary-fluid-chamber-side recess 52c differs from the angle of inclination of the radially inward surface of the auxiliary-fluid-chamber-side groove 52d, the thickness of the inclined portion 52e gradually decreases in the direction from the auxiliary fluid chamber 47 toward the primary fluid chamber 46.

The rubber block wall 53 is disposed at the radially inner portion of the upper surface of the base portion 51a of the partition member 51, which radially inner portion extends from the inner peripheral portion to the radially middle portion of the upper surface of the base portion 51a. The rubber block wall 53 has a generally "C"-shape continuously extending in the circumferential direction of the partition member 51 and is bonded by vulcanization to the upper surface of the base portion 51a and the outer surface of cylindrical inner wall portion 51b of the partition member 51. The rubber block wall 53 has a height slightly larger than the axial length of the cylindrical inner wall portion 51b and is connected integrally to the peripheral portion 52a of the movable plate 52 that is located inwardly of the cylindrical inner wall portion 51b.

The rubber block wall 53 has, at its one circumferential end, a blocking portion 53a which protrudes, with a suitable width, in the radially outward direction so as to reach near the outer peripheral edge of the partition member 51. On one of circumferentially opposite sides of the blocking wall 53a and between the mutually opposing end surfaces of the rubber block wall 53 which are opposed to each other in the circumferential direction, there is formed a communication groove 53b which extends radially inwards with a suitable width. On the other of the circumferentially opposite sides of the blocking wall 53a, there is formed a communication hole 53c which has an arcuate shape extending in the circumferential direction of the partition member 51 and which is formed through the thickness of the base portion 51a of the partition member 51. A sealing lip 53d is formed integrally on the upper surfaces of the rubber block wall 53 and the blocking portion 53a.

Each restricting projection 54 is bonded, in the vulcanization of the rubber material that gives the restricting projection 54, to a portion of the lower surface of the base portion 51a of the partition member 51, which portion is located radially slightly inwards of the outer peripheral edge of the base portion 51a. The restricting projections 54 protrude from the lower surface of the base portion 51a in the axially downward direction. Each restricting projection 54 has an arcuate shape extending in the circumferential direction along the base portion 51a. The restricting projections 54 are located at two mutually diametrically opposed positions except the communication hole 53c and a circumferential portion which is axisymmetric to the communication hole 53c. The height dimension of each restricting projection 54 as measured from the lower surface of the base portion 51a is about three times the thickness thereof as measured in the diametric direction. The distal end portion of each restricting projection 54 has a tapered inner circumferential surface whose diameter gradually decreases in the axially upward direction from the distal end portion toward the proximal end portion. At circumferentially opposite ends of each restricting projection 54, there are formed thick-walled circumferential protrusions 54a each of which protrudes from the corresponding circumferential end of the restricting projection 54 in the circumferential direction and covers the lower surface of the base portion 51a. The restricting projections 54 and the circumferential protrusions 54a are connected at the inner peripheral portions thereof integrally to the peripheral portion 52a of the movable plate 52.

The thus constructed partition structure 5 is fixed to the second mounting member 2 such that the outward flange portion 43c of the retaining member 43 is superposed on the flange portion 51d of the partition member 51, and the flange portion 51b and the outward flange portion 43c superposed on each other are held and gripped by and between the shoulder portion 23 and the caulking portion 24 of the second mounting member 2 for caulking fixation. Thus, the partition structure 5 is disposed within the fluid chamber 45 while being fixed to the second mounting member 2. According to this arrangement, the fluid chamber 45 is divided into the primary fluid chamber 46 located on the side of the elastic body 3 and the auxiliary fluid chamber 47 located on the side of the diaphragm 4.

The partition member 51 and the retaining member 43 are assembled with each other in the axial direction, so that the inner peripheral portion of the inward flange 43b of the retaining member 43 is pressed onto the upper surface of the outer peripheral portion of the rubber block wall 53 provided on the partition member 51, via the sealing rubber layer 41 interposed therebetween. Thus, the rubber block wall 53 disposed on the partition member 51 and the retaining member 43 are opposed to each other in the radial direction with a suitable spacing therebetween while the base portion 51a of the partition member 51 and the inward flange portion 43b of the retaining member 43 are opposed to each other in the axial direction with a suitable spacing therebetween, thereby defining a circumferential groove 56 which extends in the circumferential direction.

At one circumferential position of the circumferential grove 56, the blocking wall 53a formed on the partition member 51 is held in abutting contact at its side surface and upper surface with the sealing rubber layer 41 formed on the retaining member 43. Consequently, the circumferential groove 56 is intercepted at the above-indicated one circumferential position by the blocking wall 53a. On circumferentially opposite sides of the blocking wall 53a, there are positioned the communication hole 53c formed in the partition member 51 and the communication groove 53b, respectively, so that the circumferential groove 56 communicates at one of circumferentially opposite ends thereof with the primary fluid chamber 46 through the communication hole 53c and at the other of the circumferentially opposite ends with the auxiliary fluid chamber 47 through the communication groove 53b. Thus, the partition member 51 and the retaining member 43 cooperate with each other to define an orifice passage 57 which is formed at the outer peripheral portion of the partition member 51 so as to extend in the circumferential direction over a given circumferential length that is slightly shorter than one round and which allows communication between the primary fluid chamber 46 and the auxiliary fluid chamber 47 therethrough.

The restricting projections 54 bonded to the partition member 51 are disposed in an annular region in the primary fluid chamber 46, which annular region is defined by and between the mutually facing surfaces of the elastic body 3 and the rubber coating layer 31, such that the restricting projections 54 protrude from the partition member 51 in the axially downward direction. The thus disposed restricting projections 54 restrict or reduce the cross sectional area of the annular region.

The present fluid-filled vibration damping device constructed as described is installed on the vehicle such that the first mounting member 1 is fixedly attached to the bracket (not shown) of the power unit through a mounting bolt (not shown) screwed into the tapped hole 14 formed in the cylindrical member 13 of the first mounting member 1 while the second mounting member 2 is fixedly attached to the vehicle body through the bracket (not shown) having the mounting hole into which the intermediate cylindrical portion 21 of the second mounting member 2 is press-fitted. Thus, the power unit is suspended from the vehicle body in a vibration damping fashion via the fluid-filled vibration damping device. With the fluid-filled vibration damping device being thus installed, the elastic body 3 is elastically deformed by the weight of the power unit, so that the first mounting member 1 is displaced in the axial direction by a given amount relative to the second mounting member 2. Accordingly, the volume of the primary fluid chamber 46 increases than that in the state shown in FIG. 1.

When high-frequency vibrations are generated due to operation of the engine, for instance, the first and second mounting members 1, 2 are displaced relative to each other to cause the elastic body 3 to be elastically deformed, whereby the vibrations can be effectively absorbed. When low-frequency vibrations such as engine shakes are generated, the fluid pressure in the primary fluid chamber 46 is varied by application of the vibrations to cause the fluid L to flow through the orifice passage 57 between the primary fluid chamber 46 and the auxiliary fluid chamber 47, so that the input vibrations can be effectively absorbed based on resonance of the fluid L flowing through the orifice passage 57. When the movable plate 52 is displaced toward the primary fluid chamber 46 upon generation of negative pressure in the primary fluid chamber 46, the inclined portion 52e of the movable plate 52 is subjected to compressive deformation or shearing deformation depending upon the magnitude of the force applied thereto, so that the rigidity of the movable plate 52 is low in an initial period of its deformation and increases with an increase in the amount of its deformation.

Described more specifically, when the movable plate 52 is oscillated or vibrated in a relatively small amplitude range, the inclined portion 52e of the movable plate 52 is subjected to compressive force acting thereon from opposite ends of the inclined portion 52e as seen in the direction of inclination, whereby the auxiliary-fluid-chamber-side groove 52d is deformed such that the groove 52d is collapsed with its space being narrowed. Consequently, the movable plate 52 has increased rigidity at the inclined portion 52e and a portion of the same 52 subjected to the compressive force, so that the displacement of the movable plate 52 is restricted, thereby assuring an increase in the negative pressure in the primary fluid chamber 46. Accordingly, the present arrangement assures, with high reliability, the resonance effect of the fluid flowing through the orifice passage 57 from the auxiliary fluid chamber 47 to the primary fluid chamber 46, resulting in good vibration damping capability.

When the movable plate 52 is oscillated or vibrated in a large amplitude range beyond the above-indicated small amplitude range, the inclined portion 52e is subjected to shearing force and tensile force, so that the auxiliary-fluid-chamber-side groove 52d is deformed such that the groove 52d is widened, thereby decreasing the rigidity of the movable plate 52 at the inclined portion 52e and a portion of the same 52 subjected to the tensile force. Accordingly, the movable plate 52 is easily displaced so as to prevent the negative pressure in the primary fluid chamber 46 from being rapidly increased, thereby placing the primary fluid chamber 46 in a condition in which the cavitation described above is not likely to occur. Therefore, it is possible to prevent generation of the abnormal noise which arises from the cavitation.

In the present fluid-filled vibration damping device constructed as described above, the movable plate 52 has the primary-fluid-chamber-side recess 52c which is formed in one of opposite surfaces thereof located on the side of the primary fluid chamber 46 and the auxiliary-fluid-chamber-side groove 52d which is formed in the other of the opposite surfaces located on the side of the auxiliary fluid chamber 47 so as to be located radially outwardly of the primary-fluid-chamber-side recess 52c. This arrangement is capable of preventing generation of the abnormal noise due to the cavitation upon application of large vibrations while assuring good vibration damping capability in the normal state.

In the present embodiment, since the deepest portion (the bottom) of the auxiliary-fluid-chamber-side groove 52d is located radially outwardly of the outer peripheral portion (the open peripheral portion) of the primary-fluid-chamber-side recess 52c, relatively large compressive force acts on the inclined portion 52e of the movable plate 52 upon displacement of the movable plate 52 toward the primary fluid chamber 46, permitting the movable plate 52 to exhibit a higher degree of rigidity. Therefore, the present arrangement assures good vibration damping or isolating capability while also assuring a high degree of durability of the movable plate 52.

By referring next to FIGS. 5–12, there will be explained other movable plates respectively constructed according to a second, a third, a fourth, and a fifth embodiment of the invention.

Figure 5:
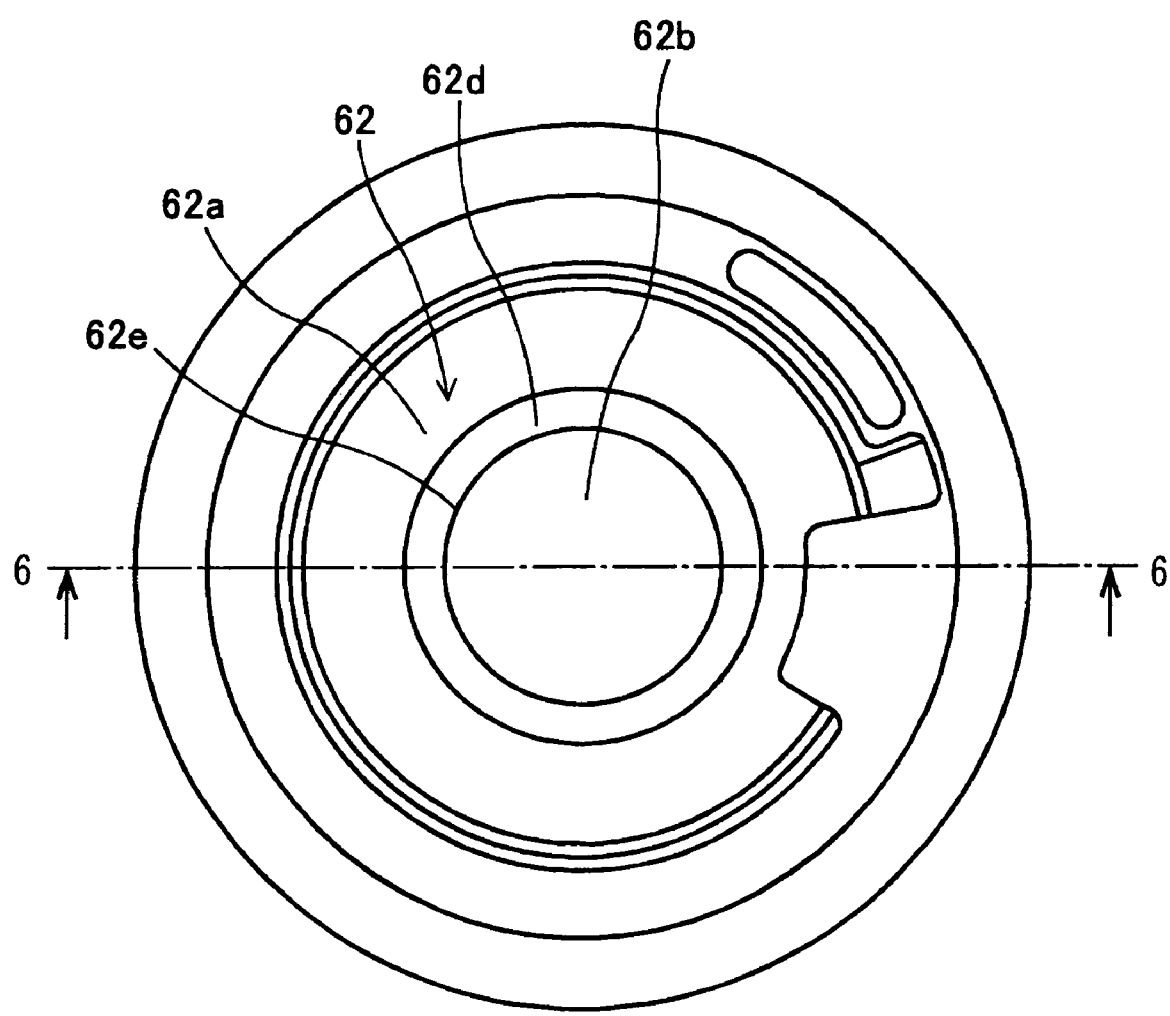
FIG. 5 is a plan view of a partition structure according to a second embodiment of the invention.
Figure 6:
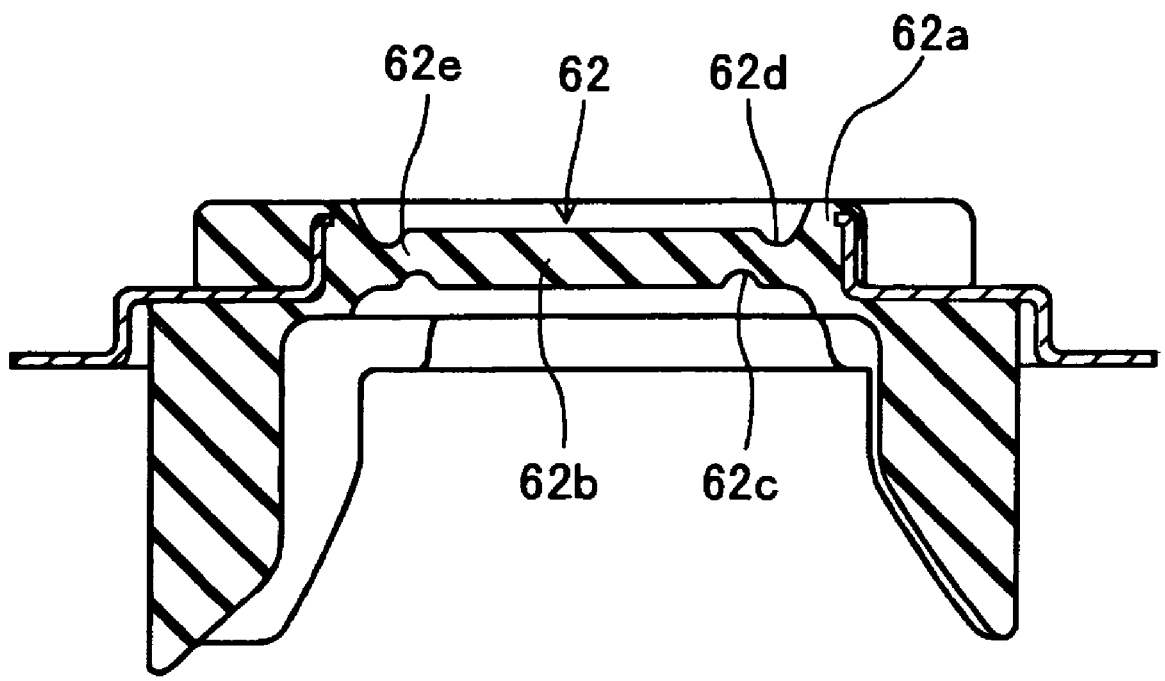
FIG. 6 is a cross sectional view taken along line 6—6 of FIG. 5.

In FIGS. 5 and 6, there is shown a movable plate 62 constructed according to the second embodiment. The movable plate 62 of this second embodiment has a peripheral portion 62a and a main body portion 62b which has a substantially constant thickness that is smaller than the thickness of the peripheral portion 62a. In the primary-fluid-chamber side surface of the main body portion 62b, there is formed an annular primary-fluid-chamber-side recess 62c which has a generally semi-circular cross sectional shape and which is located slightly inwardly of the periphery of that surface at a position away from the center of the main body portion 52b by a suitable radial distance, so as to continuously extend in the circumferential direction of the main body portion 62b. In the auxiliary-fluid-chamber-side surface of the main body portion 62b opposite to the primary-fluid-chamber-side surface, there is formed an annular auxiliary-fluid-chamber-side groove 62d which has a generally semi-circular cross sectional shape and which is located at a boundary between the peripheral portion 62a and the main body portion 62b so as to continuously extend in the circumferential direction. According to this arrangement, an inclined portion 62e is formed between the primary-fluid-chamber-side recess 62c and the auxiliary-fluid-chamber-side groove 62d formed in the main body portion 62b, which inclined portion 62e is inclined such that its diameter gradually increases in a direction from the auxiliary fluid chamber toward the primary fluid chamber.

Figure 7:
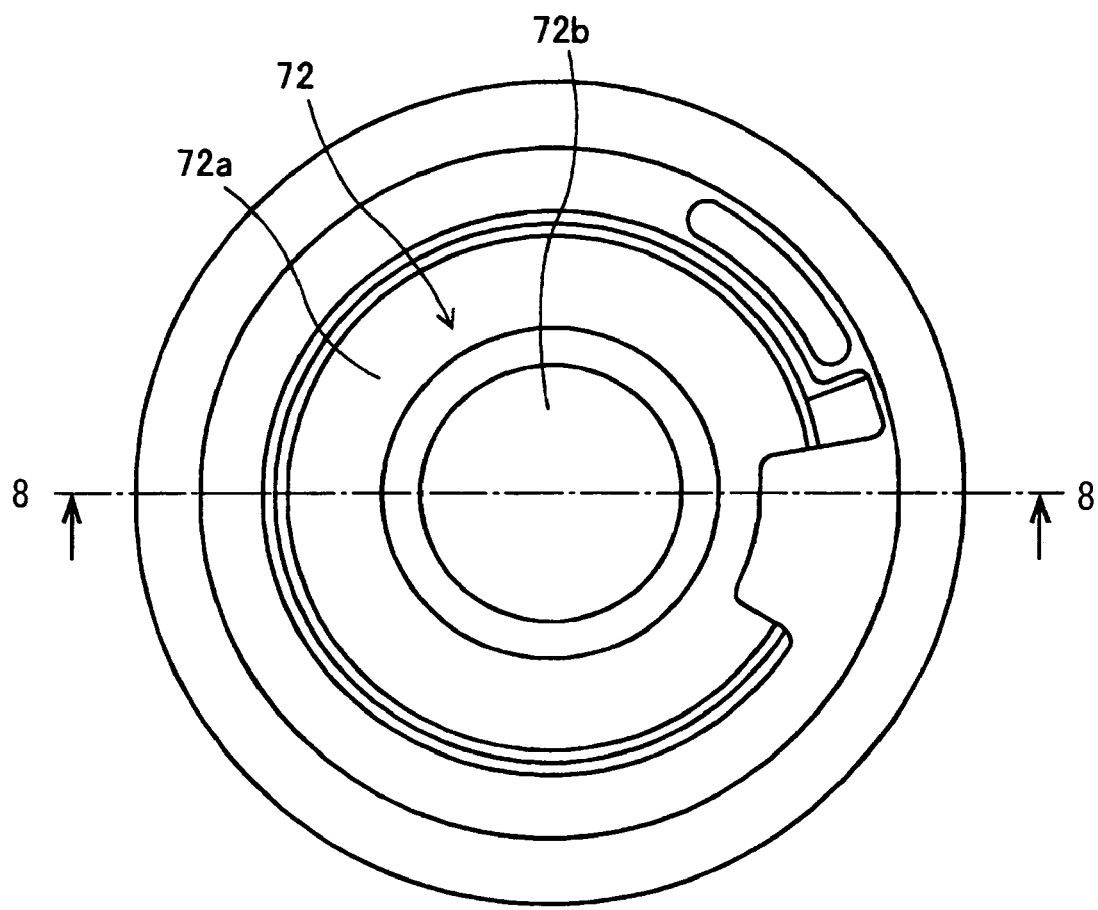
FIG. 7 is a plan view of a partition structure according to a third embodiment of the invention.
Figure 8:
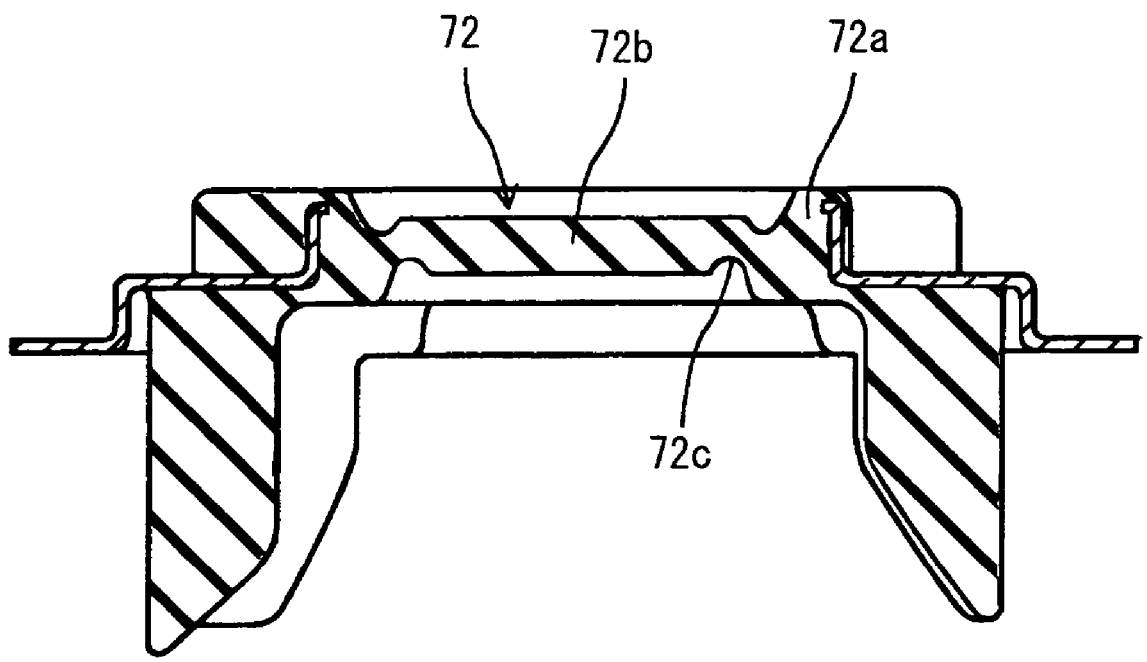
FIG. 8 is a cross sectional view taken along line 8—8 of FIG. 7.

In FIGS. 7 and 8, there is shown a movable plate 72 constructed according to the third embodiment. The movable plate 72 of the third embodiment is identical in construction with the movable plate 62 of the second embodiment as shown in FIGS. 5 and 6, except that the primary-fluid-chamber-side surface of a main body portion 72b is flush, at its radially outer portion located radially outwardly of a primary-fluid-chamber-side recess 72c, with the surface (lower surface) of a peripheral portion 72a located on the side of the primary fluid chamber. In other words, the thickness of the radially outer portion of the main body portion 72b located radially outwardly of the primary-fluid-chamber-side recess 72c is made larger than the thickness of a radially inner portion of the main body portion 72b located radially inwardly of the same 72c.

Figure 9:
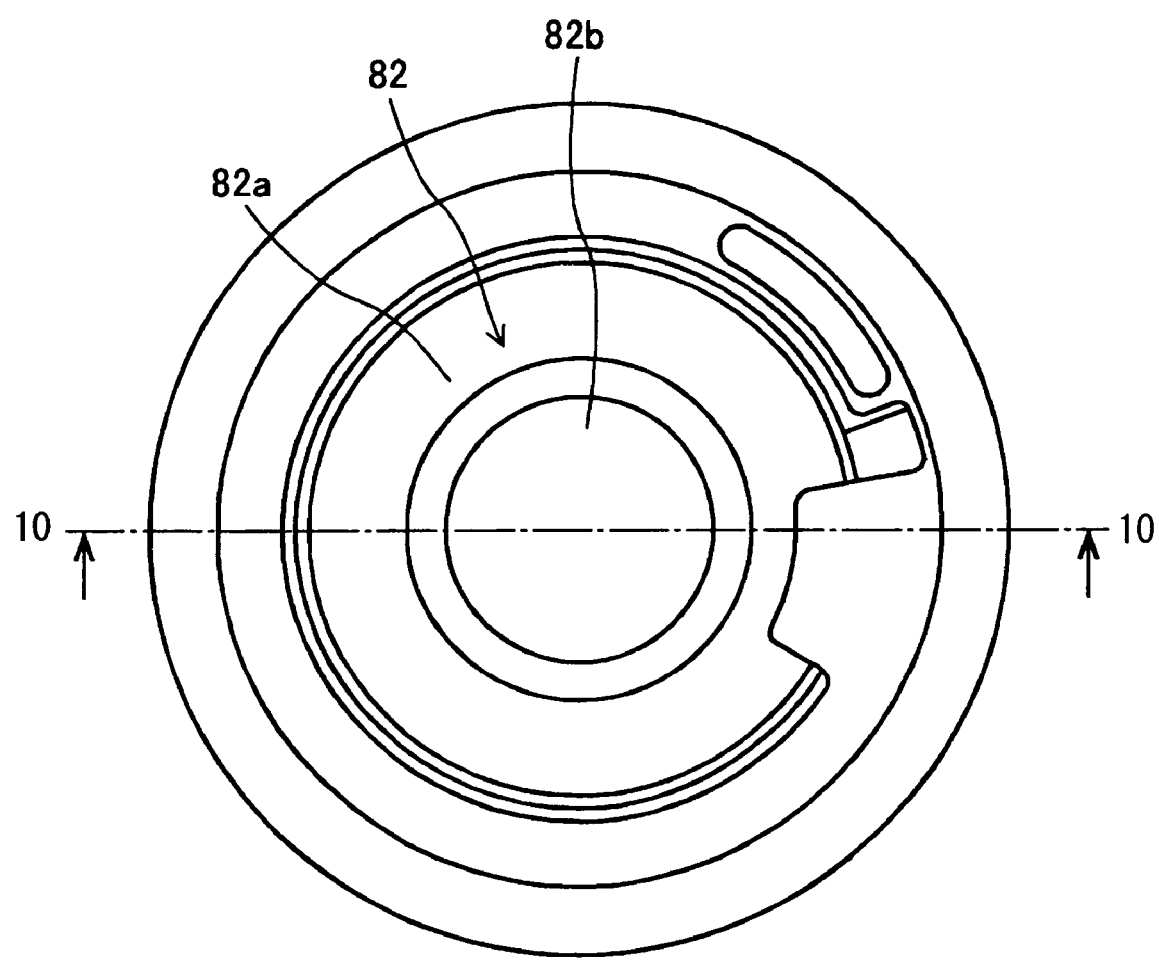
FIG. 9 is a plan view of a partition structure according to a fourth embodiment of the invention.
Figure 10:
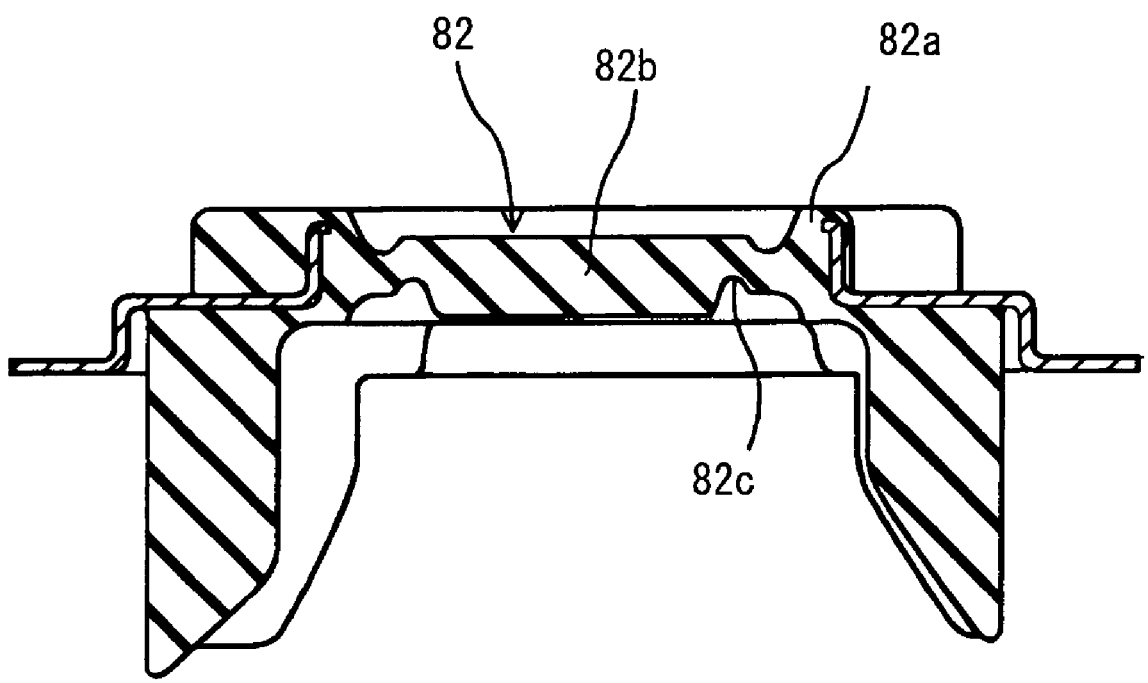
FIG. 10 is a cross sectional view taken along line 10—10 of FIG. 9.

In FIGS. 9 and 10, there is shown a movable plate 82 constructed according to the fourth embodiment. The movable plate 82 of the fourth embodiment is identical in construction with the movable plate 62 of the second embodiment as shown in FIGS. 5 and 6, except that a difference between a height position of the primary-fluid-chamber-side surface of a main body portion 82b at its radially inner portion located radially inwardly of a primary-fluid-chamber-side recess 82c and a height position of the surface (lower surface) of a peripheral portion 82a located on the side of the primary fluid chamber is small. In other words, the thickness of the radially inner portion of the main body portion 82b located radially inwardly of the primary-fluid-chamber-side recess 82c is made larger than the thickness of a radially outer portion of the main body portion 82b located radially outwardly of the same 82c.

Figure 11:
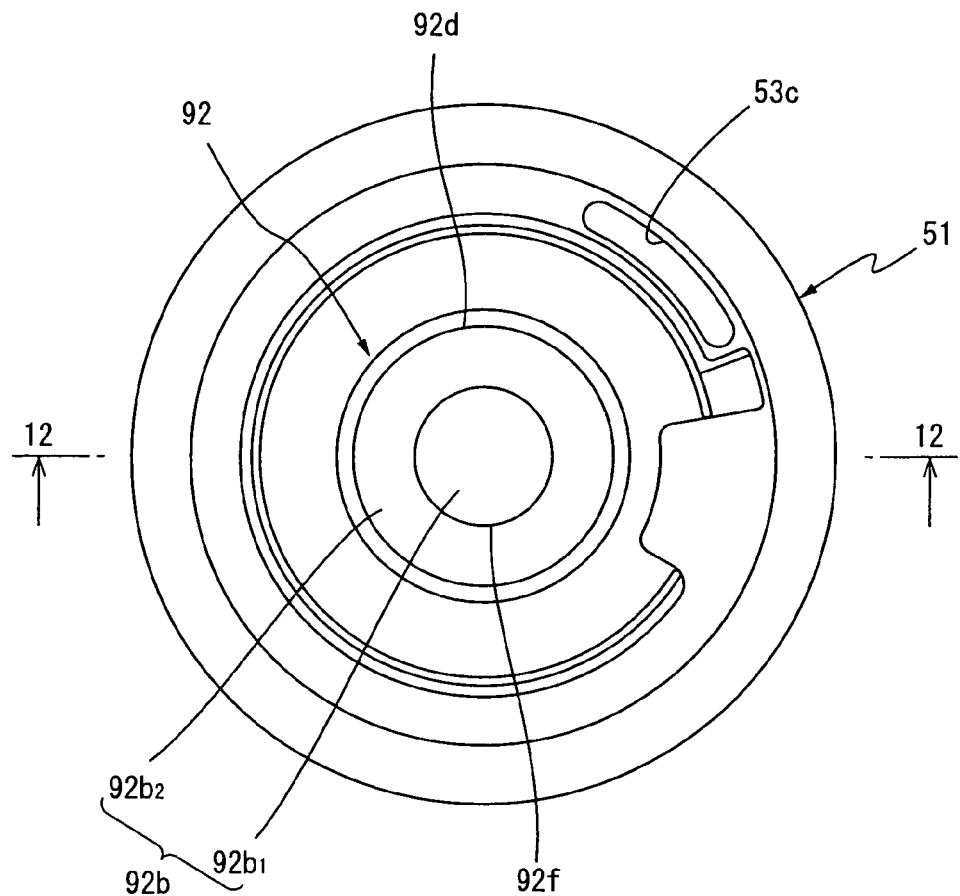
FIG. 11 is a plan view of a partition structure according to a fifth embodiment of the invention.
Figure 12:
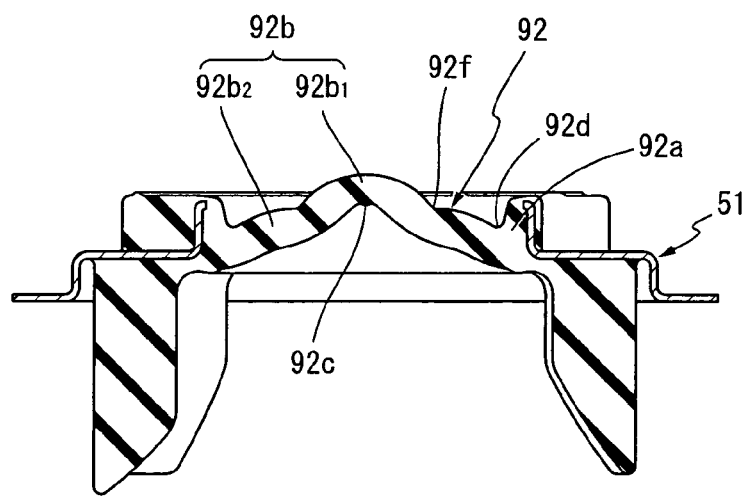
FIG. 12 is a cross sectional view taken along line 12—12 of FIG. 11.
Figure 13:
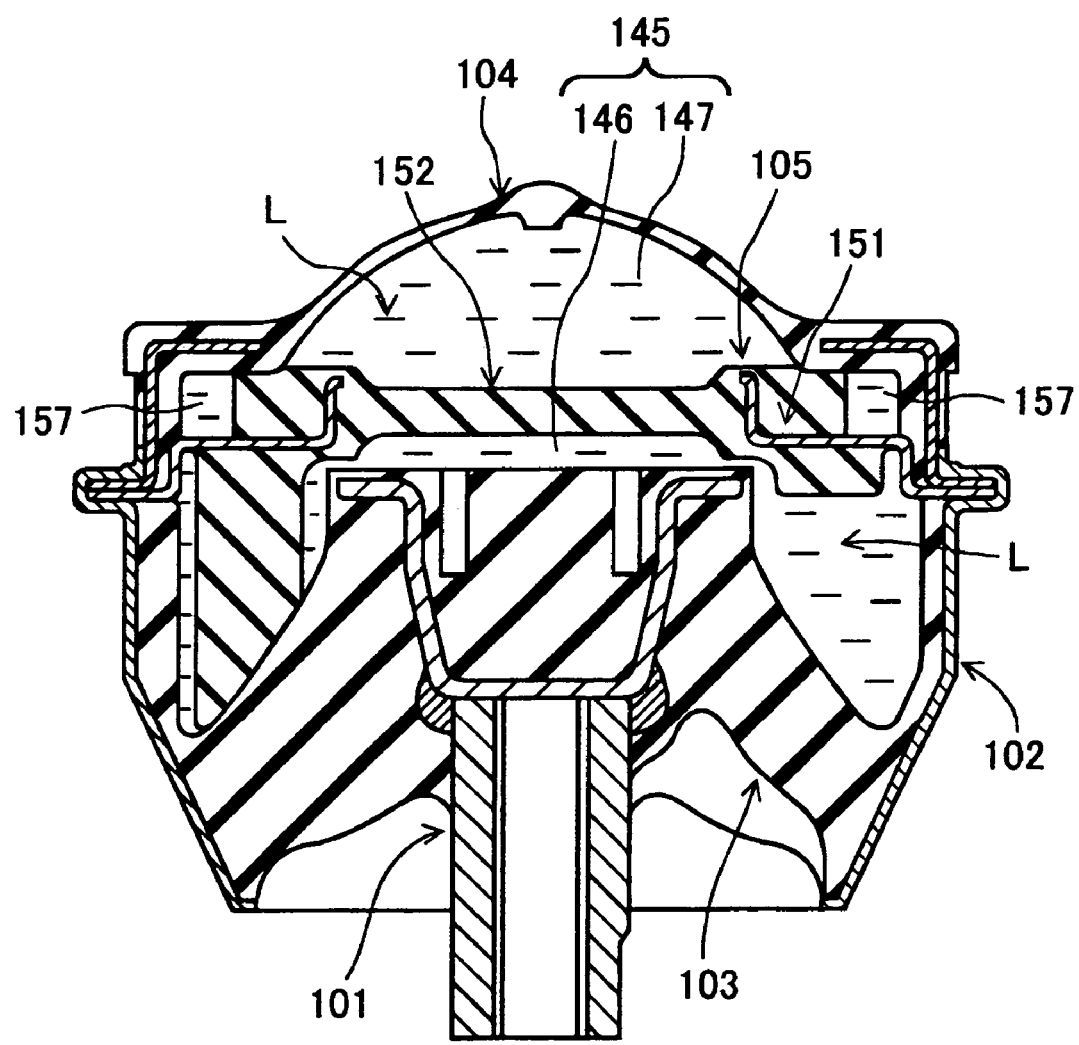
FIG. 13 is a cross sectional view showing a conventional fluid-filled vibration damping device.

In FIGS. 11 and 12, there is shown a movable plate 92 constructed according to the fifth embodiment. The movable plate 92 includes a peripheral portion 92a and a main body portion 92b which includes: an inner protruding portion $92b_1$ having a suitable thickness and located at a radially central portion of the movable plate 92 so as to protrude toward the auxiliary fluid chamber; and an outer protruding portion $92b_2$ having a suitable thickness and located radially outwardly of the inner protruding portion $92b_1$ so as to protrude toward the auxiliary fluid chamber. The inner and outer protruding portions $92b_1$, $92b_2$ are formed integrally with each other. The movable plate 92 whose main body portion 92 has the inner and outer protruding portions $92b_1$, $92b_2$ connected and formed adjacent to each other as described above protrudes toward the auxiliary fluid chamber in two steps.

As is apparent from FIG. 11, the main body portion 92 has a circular shape as a whole in its plan view. As is apparent from FIG. 12 showing the partition structure in vertical cross section, in other words, showing the partition structure cut along a plane that includes a center axis line of the movable plate 92, the inner protruding portion $92b_1$ is provided by a curved portion having the suitable thickness and an arcuate shape in vertical cross section, whereby the surface of the main body portion 92b located on the auxiliary fluid chamber assumes a part of a spherical surface. The outer protruding portion $92b_2$ located radially outwardly of the inner protruding portion $92b_1$ has an annular shape in its plan view and is provided by a curved portion having the suitable thickness and an arcuate shape as a whole in vertical cross section. The surface of the main body portion 92b located on the primary fluid chamber is provided by an inclined surface which extends from the inner protruding portion $92b_1$ to the outer protruding portion $92b_2$ and whose diameter gradually increases in a direction toward the primary fluid chamber, thereby forming a primary-fluid-chamber-side recess 92c whose deepest portion is located at a radially central portion of the inner protruding portion $92b_1$. In the meantime, in the surface of the main body portion 92b located on the auxiliary fluid chamber, there are formed: a stepped portion (a concave portion) 92f which is formed between the two protruding portions, i.e., the inner and outer protruding portions $92b_1$, $92b_2$ which are connected and formed adjacent to each other; and an auxiliary-fluid-chamber-side groove 92d at a connected portion where the outer periphery of the outer protruding portions $92b_2$ and the peripheral portion 92a of the movable plate 92 are connected to each other.

In the main body portion 92b in which the two protrusions $92b_1$, $92b_2$ are formed in concentric relation, the small vibrations act as compressive load on the respective outer peripheral portions of the inner and outer protruding portions $92b_1$, $92b_2$, so that the rigidity of the main body portion 92b, accordingly, the rigidity of the movable plate 92 can be effectively increased. Upon application of the large vibrations, on the other hand, the movable plate 92 which protrudes in two steps as described above is easily deformed, advantageously avoiding or preventing generation of the abnormal noise due to the cavitation. The deforming behavior of the movable plate 92 can be more effectively achieved where the arcuate shape of the inner protruding portion $92b_1$ has a radius curvature smaller than that of the arcuate shape of the outer protruding portion $92b_2$ as shown in FIG. 12.

In the illustrated second through fifth embodiments, since the elements of the partition structure other than explained in the respective embodiments are similar to those in the partition structure 5 in the illustrated first embodiment of FIGS. 1–3, the reference numbers are given to only primary elements, as needed, and a detailed explanation is dispensed with.

While the present fluid-filled vibration damping device is of a suspension type in which the engine unit is suspended from the vehicle body in a vibration damping or isolating fashion, the principle of the invention is equally applicable to a fluid-filled vibration damping device in which the engine unit is mounted on the vehicle body in a vibration damping or isolating fashion.

Tests

Figure 4:
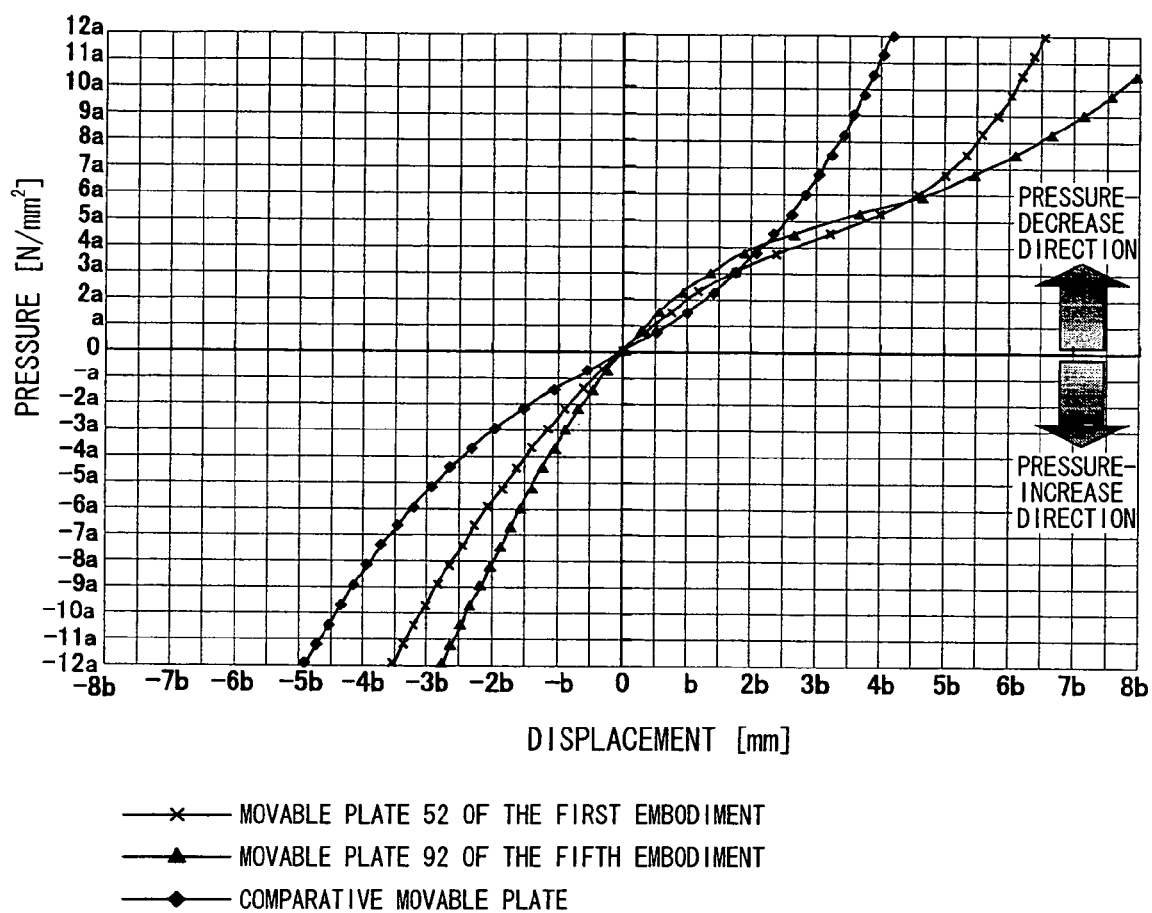
FIG. 4 is a graph showing results of tests for examining spring characteristics of movable plates in the first and fifth embodiments, respecively.

To confirm the advantageous effect exhibited by the present fluid-filled vibration damping device, tests were performed to examine spring characteristics (i.e., pressure-displacement relationship) of the movable plates 52, 92 according to the respective first and fifth embodiments illustrated above. In the tests, one of the opposite surfaces of each of the movable plates 52, 92 (located on the auxiliary fluid chamber) was continuously subjected to pressure varying from negative to positive, and there were respectively measured amounts of displacement of the main body portion 52b of the movable plate 52 and the main body portion 92b of the movable plates 92, upon application of the pressure. The tests were performed by applying, to the movable plates 52, 92, the pressure in a range from −12a to +12 $aN/mm^2$, which range is set on the basis of non-application of the pressure. The results of the tests are indicated in the graph of FIG. 4. A comparative test was performed under the same conditions as those in the tests using the movable plates 52, 92 of the respective first and fifth embodiments, by using a movable plate which differs from the present movable plates 52, 92 in that its man body portion is given by a flat plate having a constant thickness and has neither recess nor inclined portion. The results of the comparative test are also indicated in the graph of FIG. 4. In the graph of FIG. 4, the "pressure-decrease direction" indicated by the upper arrow means a direction in which the pressure in the primary fluid chamber is decreased while the "pressure-increase direction" indicated by the lower arrow means a direction in which the pressure in the primary fluid chamber is increased.

As is apparent from the results shown in the graph of FIG. 4, the amount of displacement of the movable plate 52 according to the first embodiment is smaller than the amount of displacement of the comparative movable plate (comparative product) within a range in which the positive pressure of 0–3 $aN/mm^2$ is applied. When the positive pressure exceeding 3 $aN/mm^2$ is applied, the amount of displacement of the movable plate 52 increases with an increase in the positive pressure applied thereto, unlike the comparative movable plate. It is also apparent from the results shown in the graph of FIG. 4 that the amount of displacement of the movable plate 92 according to the fifth embodiment is smaller than the amount of displacement of the comparative movable plate (comparative product) within a range in which the positive pressure from 0 to 4 $aN/mm^2$ is applied. When the positive pressure exceeding 4 $aN/mm^2$ is applied, the amount of displacement of the movable plate 92 increases with an increase in the positive pressure applied thereto, unlike the comparative movable plate. Further, the amount of displacement of the movable plate 92 of the fifth embodiment is slightly smaller than that of the movable plate 52 of the first embodiment within a range in which the positive pressure of 0-6 $aN/mm^2$ is applied, and a rate of increase in the amount of displacement of the movable plate 92 is larger than that of the movable plate 52 when the positive pressure exceeding 6 $aN/mm^2$ is applied.

It is to be understood from the results that the rigidity of the movable plates 52, 92 of the respective first and fifth embodiments of the present invention is high (i.e., the movable plates 52, 92 are hard) at an initial stage of deformation thereof and the rigidity of the movable plates 52, 92 increases (i.e., the movable plates 52, 92 become soft) with an increase in the amount of deformation thereof, in a case when the movable plates 52, 92 are deformed toward the primary fluid chamber by application of the positive pressure to the above-indicated one surface thereof nearer to the auxiliary fluid chamber. This case corresponds to a case in which the movable plate is deformed toward the primary fluid chamber by the negative pressure generated in the primary fluid chamber. Thus, the movable plates 52, 92 according to the respective first and fifth embodiments of the present invention exhibit excellent spring characteristics for preventing occurrence of the abnormal noise due to the cavitation upon application of large vibrations while assuring excellent vibration damping or isolating capacity in the normal state. In particular, the movable plate 92 of the fifth embodiment exhibits more effective spring characteristics because the rigidity of the movable plate 92 at the initial stage of its deformation is slightly higher than that of the movable plate 52 and the rigidity of the movable plate 92 upon large deformation thereof is lower than that of the movable plate 52.

It is to be understood that the present invention may be embodied with various other changes and modifications which may occur to those skilled in the art, without departing from the spirit and scope of the invention defined in the attached claims.

What is claimed is:

1. A fluid-filled vibration damping device for connecting two members in a vibration-damping fashion, comprising:
    a first mounting member which is to be fixed to one of the two members;
    a cylindrical second mounting member which is disposed so as to be spaced apart from the first mounting member and which is to be fixed to the other of the two members;
    an elastic body which is interposed between the first mounting member and the second mounting member for connecting the first mounting member and the second mounting member integrally to each other;
    a diaphragm whose peripheral portion is retained by the second mounting member so that the diaphragm cooperates with the elastic body to define therebetween a fluid chamber which is filled with a fluid; and
    a partition structure, which includes an annular metallic partition member and a flexible movable plate disposed in a central opening of the annular metallic partition member, wherein a peripheral portion of the partition structure is retained by the second mounting member, a peripheral portion of the movable plate is fixed to the annular metallic portion member, and the movable plate divides the fluid chamber into a primary fluid chamber and an auxiliary fluid chamber which communicate with each other through an orifice passage,
    wherein the movable plate has a primary-fluid-chamber-side recess, which consists of a single recess formed in one of opposite surfaces thereof located on the side of the primary fluid chamber and which has a predetermined depth, and an auxiliary-fluid-chamber-side groove, which consists of a single groove formed in the other of the opposite surfaces located on the side of the auxiliary fluid chamber so as to be positioned radially outwardly of the primary-fluid-chamber-side recess and which continuously or discontinuously extends in the circumferential direction,
    wherein when a positive pressure is generated in the primary fluid chamber, the single auxiliary-fluid-chamber-side groove is deformed such that the groove is collapsed with its space being narrowed, whereby a rigidity of the flexible movable plate is increased, and
    wherein when a negative pressure is generated in the primary fluid chamber, the single primary-fluid-chamber-side recess is subjected to a compressive shearing deformation, whereby the rigidity of the flexible movable plate is decreased.

2. A fluid-filled vibration damping device according to claim 1, wherein the movable plate has an inclined portion which is formed and defined by and between the primary-fluid-chamber-side recess and the auxiliary-fluid-chamber-side groove so as to be inclined such that the inclined portion has a diameter which gradually increases in a direction from the auxiliary fluid chamber toward the primary fluid chamber.

3. A fluid-filled vibration damping device according to claim 2, wherein the peripheral portion of the movable plate is thick-walled, and the movable plate includes a main body portion located radially inwardly of the peripheral portion of the movable plate that has a thickness smaller than that of the peripheral portion of the movable plate, the inclined portion being provided in the main body portion.

4. A fluid-filled vibration damping device according to claim 1, wherein the primary-fluid-chamber-side recess continuously or discontinuously extends in a circumferential direction of the movable plate.

5. A fluid-filled vibration damping device according to claim 1, wherein the primary-fluid-chamber-side recess is a circular recess.

6. A fluid-filled vibration damping device according to claim 1, wherein the auxiliary-fluid-chamber-side groove is formed such that a deepest portion thereof is located radially outwardly of an outer peripheral portion of the primary-fluid-chamber-side recess.

7. A fluid-filled vibration damping device according to claim 1, wherein the movable plate includes: an inner protruding portion having a suitable thickness and located at a radially central portion thereof so as to protrude toward the auxiliary fluid chamber; and an outer protruding portion having a suitable thickness and located radially outwardly of the inner protruding portion so as to protrude toward the auxiliary fluid chamber, and portions of the above-indicated one of the opposite surfaces of the movable plate located on the side of the primary fluid chamber, which portions correspond to the inner protruding portion and the outer protruding portion, define the primary-fluid-chamber-side recess whose deepest portion is located at a center of the inner protruding portion while the auxiliary-fluid-chamber-side groove is formed at an outer peripheral portion of the outer protruding portion.

8. A fluid-filled vibration damping device according to claim 7, wherein the inner protruding portion has a circular shape in a plan view and an arcuate shape in vertical cross section while the outer protruding portion has an annular shape in a plan view and an arcuate shape as a whole in vertical cross section.

9. A fluid-filled vibration damping device according to claim 8, wherein the arcuate shape of the inner protruding portion has a radius of curvature smaller than that of the arcuate shape of the outer protruding portion.

\* \* \* \* \*